United States Patent [19]

Betzig et al.

[11] Patent Number: 5,288,999
[45] Date of Patent: Feb. 22, 1994

[54] MANUFACTURING METHOD INCLUDING NEAR-FIELD OPTICAL MICROSCOPIC EXAMINATION OF A SEMICONDUCTOR WAFER

[75] Inventors: Robert E. Betzig, Chatham; Ernst M. Gyorgy, Madison; Jay K. Trautman, Chatham; Raymond Wolfe, New Providence, all of N.J.

[73] Assignee: AT&T Bell Laboratories, Murray Hill, N.J.

[21] Appl. No.: 1,234

[22] Filed: Jan. 6, 1993

Related U.S. Application Data

[60] Division of Ser. No. 925,809, Aug. 4, 1992, which is a continuation-in-part of Ser. No. 771,413, Oct. 10, 1991, abandoned, which is a continuation-in-part of Ser. No. 615,537, Nov. 19, 1990, abandoned.

[51] Int. Cl.$^5$ .................... G02B 21/06; G01N 21/63
[52] U.S. Cl. ................... 250/227.26; 359/368; 427/553
[58] Field of Search ............ 250/216, 227.11, 227.20, 250/227.26, 227.28, 235, 365, 368, 458.1, 459.1, 461.1, 461.2, 467, 492.1; 436/134; 359/368, 385, 389, 894; 385/12, 123, 133; 156/626; 427/553, 558, 595, 596

[56] References Cited

U.S. PATENT DOCUMENTS

| | | | |
|---|---|---|---|
| 4,604,520 | 8/1986 | Pohl | 250/216 |
| 4,662,747 | 5/1987 | Isaacson et al. | 356/317 |
| 4,684,206 | 8/1987 | Bednorz et al. | 350/96.12 |
| 4,725,727 | 2/1988 | Harder et al. | 250/227.28 |
| 4,917,462 | 4/1990 | Lewis et al. | 359/368 |
| 5,018,865 | 5/1991 | Ferrell et al. | 356/376 |
| 5,044,723 | 9/1991 | MacDonald | 385/12 |
| 5,105,305 | 4/1992 | Betzig et al. | 359/368 |

FOREIGN PATENT DOCUMENTS

426571A1  10/1990  France.

OTHER PUBLICATIONS

R. D. Reddick, et al., "New Form of Scanning Optical Microscopy", *Physical Review B*, vol. 39, No. 1, Jan. 1989, pp. 767–700.

R. D. Reddick, et al., "Photon Scanning Tunneling Microscopy", *Rev. Sci. Instrum.*, vol. 61, No. 12, Dec. 1990, pp. 3669–3677.

E. Betzig, et al., "Collection Mode Near-Field Scanning Optical Microscopy", *Appl. Phys. Lett.* vol. 5, No. 21, Dec. 1987, pp. 2088–2090.

U. Dürig, et al., "Near-Field Optical-Scanning Microscopy", *J. Appl. Phys.*, vol. 59, No. 10, May 1986, pp. 3318–3327.

A. Harootunian, et al., "Super-Resolution Fluorescence Near-Field Scanning Optical Microscopy", *Appl. Phys. Lett.*, vol. 49, No. 11, Sep. 1986, pp. 674–676.

*Primary Examiner*—David C. Nelms
*Assistant Examiner*—John R. Lee
*Attorney, Agent, or Firm*—Martin I. Finston

[57] ABSTRACT

An optical system useful, e.g., for near-field scanning optical microscopy is provided. The system incorporates a probe having improved properties. In one embodiment, the probe comprises a tapered and partially metallized portion of a single-mode optical fiber.

2 Claims, 6 Drawing Sheets

MANUFACTURING METHOD INCLUDING NEAR-FIELD OPTICAL MICROSCOPIC EXAMINATION OF A SEMICONDUCTOR WAFER

This is a division of application Ser. No. 07/925,809 filed Aug. 4, 1992, which is a continuation-in-part of U.S. application Ser. No. 07/771,413, filed Oct. 10, 1991, now abandoned, continuation U.S. application Ser. No. 07/615,537 filed Nov. 19, 1990, abandoned.

FIELD OF THE INVENTION

This invention relates to optical microscopes in which a small aperture, typically smaller than an optical wavelength, is positioned within the optical near field of a specimen, i.e., within a distance of less than about an optical wavelength of the specimen, and the aperture is scanned in raster fashion over the surface of the specimen to produce a time-varying optical signal that is detected and reconstructed to produce an image having extremely high resolution. The invention further relates to methods of use of such microscopes for inspecting workpieces in the course of manufacturing processes.

ART BACKGROUND

Microscopes employing conventional optical imaging systems cannot resolve features substantially smaller than about one-half an optical wavelength. That is, when both the entrace pupil of the microscope objective and its distance from the specimen are substantially larger than a wavelength, diffraction effects limit the smallest resolvable separation between a pair of object points to 0.5 $\lambda$/N.A., where $\lambda$ is the optical wavelength and N.A. denotes the numerical aperture of the objective, which, as a practical matter, is limited to values of about 1.6 or less. (F. A. Jenkins and H. E. White, *Fundamentals of Optics*, Third Edition, McGraw-Hill Book Co., New York, 1957, pp. 306-308.)

Electron microscopy has been successful in resolving features much smaller than those resolvable with conventional optical microscopy. However, for some applications, electron microscopy suffers from certain disadvantages. For example, the specimen must be enclosed in an evacuated chamber. Where the electron microscope is employed as a diagnostic device on a production line for, e.g., semiconductor wafers, the time required to vent and evacuate the chamber may detract significantly from the manufacturing throughput. As another example, certain features of a specimen that are detectable by optical microscopy may nevertheless be invisible to an electron microscope, because different contrast mechanisms are involved. As yet another example, the vacuum environment, or exposure to the electron beam, may be destructive to the specimen.

A number of researchers have investigated the use of optical scanning to circumvent the inherent limitations of conventional optical imaging systems. That is, in so-called near-field scanning optical microscopy (NSOM), an aperture having a diameter that is smaller than an optical wavelength is positioned in close proximity to the surface of a specimen, and scanned over the surface. In one scheme, the specimen is reflectively or transmissively illuminated by an external source. A portion of the reflected or transmitted light is collected by the aperture and relayed to a photodetector by, for example, an optical fiber. In an alternate scheme, light is relayed by an optical fiber to the aperture, which itself functions as miniscule light source for reflective or transmissive illumination of the specimen. In that case, conventional means are used to collect and detect the selected or transmitted light. In either case, the detected optical signal is reconstructed to provide image information.

Thus, for example, U.S. Pat. No. 4,604,520, issued to W. D. Pohl on Aug. 5, 1986, describes an NSOM system using a probe made from a pyramidal, optically transparent crystal. An opaque metal coating is applied to the crystal. At the apex of the crystal, both the tip of the crystal and the metal coating overlying the tip are removed to create the aperture, which is essentially square and has a side length less than 100 nm.

Also described in U.S. Pat. No. 4,604,520 is an alternative aperture made from a single-mode optical fiber. One planar end of the fiber is metallized, and a coaxial hole is formed in the coating so as to just expose the core of the fiber.

In a somewhat different approach, U.S. Pat. No. 4,917,462, issued to A. L. Lewis, et al. on Apr. 17, 1990, describes a probe formed from a pipette, i.e., a glass tube that is drawn down to a fine tip and coated with an opaque metal layer. After drawing, the pipette retains a hollow bore, which emerges through both the glass and the overlying metal layer at the tip. The resulting metal annulus defines the aperture. The aperture may be smaller than the bore defined in the glass, as a result of radially inward growth of the metal layer.

In yet another approach, R. C. Reddick, et al., "New form of scanning optical microscopy," *Phys. Rev. B*, 39 (1989) pp. 767-770, discusses the use of a single-mode optical fiber as a probe for so-called photon scanning tunneling microscopy (PSTM). The fiber tip is sharpened by etching, and the tip is optionally coated with an opaque material to define an aperture on the very end of the fiber tip. (It should be noted that PSTM differs from transmission or reflection microscopy in that the illumination system is adapted to produce total internal reflection of the PSTM specimen. The probe tip is brought into the evanescent optical field above the sample. A portion of the optical energy in the evanescent near field is coupled into the probe and propagates through it, ultimately reaching a detector.)

One drawback of most of the above-described methods is that light is transmitted through the probe with relatively low efficiency. As a consequence, signal levels are relatively low. In some cases, apertures must be made larger in order to compensate for low signal levels. This measure is undesirable because it results in lower resolution. (PSTM generally offers relatively high signal levels, but resolution is generally no better than can be achieved by conventional optical microscopy.)

For example, when light is transmitted from a source to the aperture through an uncoated pipette, the optical field has a substantial amplitude at the outer walls of the pipette. In order to confine radiation, it is necessary to coat the walls with metal. However, attenuation occurs as a result of absorption in the metal coating. Moreover, metal coatings are prone to imperfections, such as pinholes, that permit optical leakage. When this tendency is countered by increasing the metal thickness, the length (i.e., the thickness in the axial direction of the pipette) and outer diameter of the metal annulus defining the aperture are also increased. As a result, optical losses due to absorption and evanescence in the metal annulus are increased and the size of the tip is increased. Enlarging the tip makes it more difficult to scan narrow concave topographical features of the specimen while maintaining close proximity to the specimen surface. (Significantly, the problem of excessive tip size due to metal deposition also applies to constant-diameter optical fiber probes of the type having an aperture defined by a hole in a metal layer coating the end of the fiber.)

Analogous problems occur when light is transmitted in the opposite direction, i.e., from the specimen (by transmission or reflection) into the aperture, and thence through the pipette toward a detector. The optical signal is attenuated in the aperture region, as described. A portion of the optical signal may be lost by absorption in the metal coating of the walls, and through pinhole leaks in the metal coating, also as described. Moreover, scattered light may enter the pipette through pinhole leaks, resulting in an increased noise level at the detector.

Still further problems occur because a portion of the light that passes through the pipette toward the aperture is reflected from the outer glass walls of the pipette. After suffering multiple reflections, some of the light may undergo a reversal of propagation direction. As a consequence, the amount of light incident on the specimen may be reduced.

Probes made from pyramidal crystals suffer difficulties that are analogous to those described above in connection with pipette-type probes.

Problems that occur when the probe is a single-mode fiber having a sharpened (e.g., by etching) conical tip and no metal coating are described, e.g., in C. Girard and M. Spajer, "Model for reflection near field optical microscopy," *Applied Optics*, 29 (1990) pp. 3726-3733. One problem is that a portion of the light passing through the fiber toward the tip may be reflected by, and then transmitted through, the sides of the conical taper. A second problem is that the sides of the taper may capture undesired optical signals that can propagate through the fiber, resulting in an increased noise level at the detector.

In view of the foregoing discussion, it is apparent that investigators have hitherto been unsuccessful in providing an NSOM probe that combines efficient transmission of light (i.e., transmission that is relatively free of attenuation due to optical interactions with the walls of the probe) with relatively small tip dimensions, high resolution, and high reliability.

SUMMARY OF THE INVENTION

In one aspect, the invention involves an optical system, comprising: a probe, at least a portion of which is optically transmissive at least at a given wavelength, the probe having a distal end; an optical aperture defined in the distal end, the aperture having a diameter smaller than the given wavelength; means for optically coupling a light source to the probe such that at least some light emitted by the source, at least at the given wavelength, enters or exits the probe through the aperture; and means for displacing the probe relative to an object, characterized in that: (a) the probe comprises a portion of a single-mode optical fiber having a core and a cladding, the cladding having an outer surface, there being associated with the fiber a guided dielectric mode; (b) the fiber has a taper region that is adiabatically tapered, at least a portion of the taper region being capable of guiding light of at least the given wavelength; (c) the taper region terminates in a substantially flat end face oriented in a plane substantially perpendicular to the fiber, the aperture being defined in the end face; (d) the cladding outer surface in the taper regions substantially smooth; (e) at least a portion of the cladding outer surface in the taper region is coated with metal, defining a metallic waveguide portion capable of guiding a metallic mode, there further being defined a cutoff diameter for the metallic mode; and (f) the end face diameter is less than or equal to the cutoff diameter.

DETAILED DESCRIPTION

Figure 1:
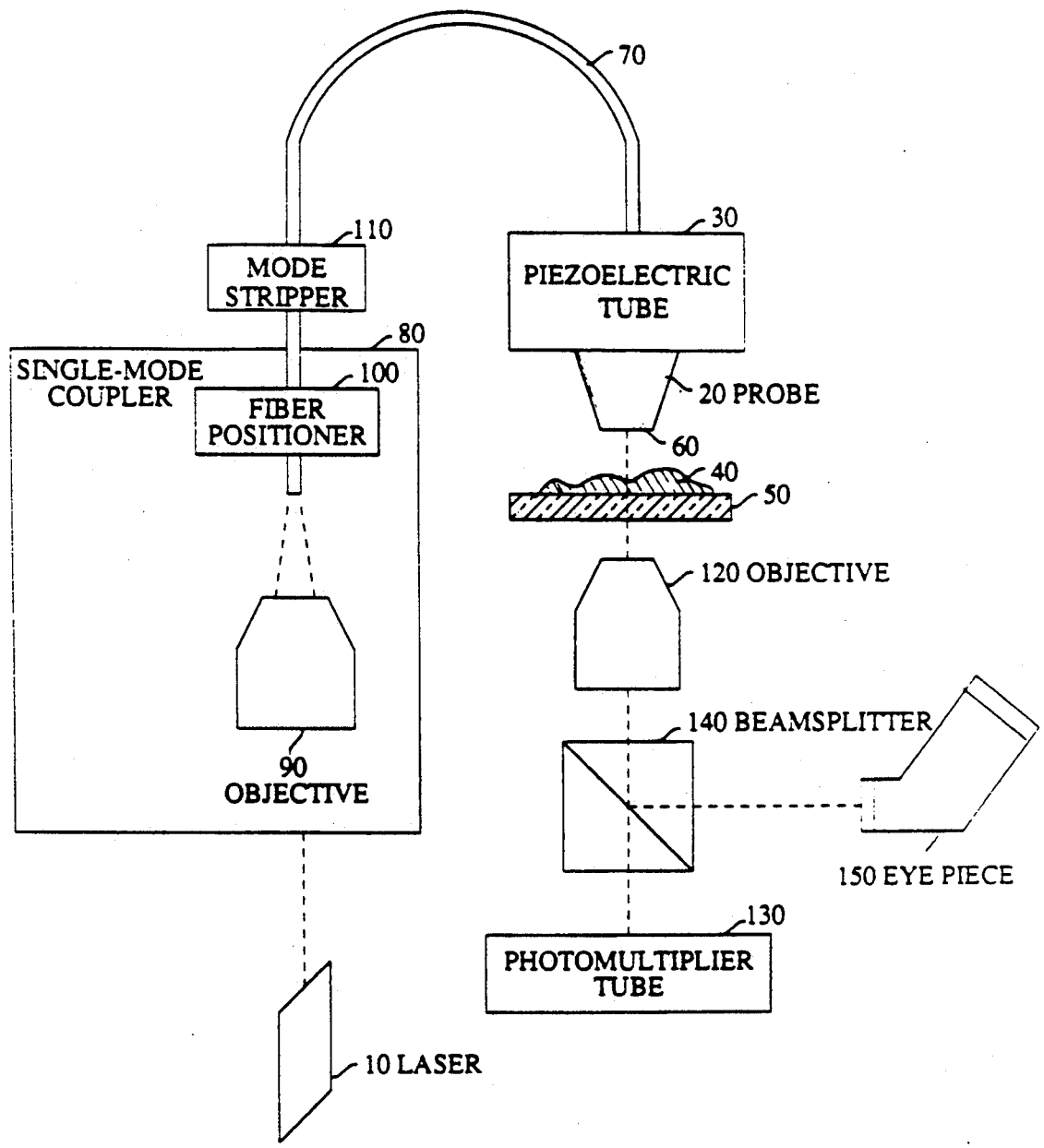
FIG. 1 is a schematic drawing of an exemplary optical system useful for near-field scanning optical microscopy.

In one embodiment, the invention involves an optical system. Turning to FIG. 1, such an optical system includes a light source 10, a probe 20, displacement means 30 for displacing the probe relative to an object 40 disposed, exemplarily on a stage 50, adjacent the probe tip 60. The optical system further comprises means for optically coupling light source 10 to probe 20. In the example illustrated in FIG. 1, the optical coupling is provided by a single-mode optical fiber 70 extending between light source 10 and probe 20. (Fiber 70 may, in fact, be integral with probe 20.) Light source 10 is exemplarily a laser. Light from source 10 is readily injected into the optical fiber by way, e.g., of a single-mode coupler 80, which includes a microscope objective 90 and a fiber positioner 100. A mode stripper 110 is also optionally included in order to insure that only the single mode in the core is propagated to the probe, and not other modes in the cladding. The displacement means 30 may, for example, be a piezoelectric tube adapted for moving the probe vertically as well as in two orthogonal lateral dimensions. Alternatively, the displacement means may be mechanical or piezoelectric means for moving the stage rather than the probe, or some combination of stage-displacement and probe-displacement means.

One possible use for an optical system as described is for direct writing. That is, the sample surface proximate the probe tip may be coated with a photosensitive layer that is capable of being exposed by light emitted from the light source. An exposure pattern is created in the photosensitive layer by displacing the probe relative to the sample, while light from the light source is continuously or intermittently emitted from the probe tip.

A second possible use for an optical system as described is for imaging of the sample in a so-called "illumination" mode. According to this application, light from the probe tip is transmitted through the sample and collected below the stage (as shown in FIG. 1) by microscope objective 120. (Illustrated is an illumination-transmission mode; an illumination-reflection mode is also readily practiced.) The collected light is directed into detector 130, which is exemplarily a photomultiplier tube. For visual positioning of the probe, it is also desirable to include a beamsplitter 140, which directs a portion of the collected light into an eyepiece 150. Significantly, when the sample is scanned by a raster-like displacement of the probe, the signals from detector 130 can be reconstructed to produce an image of the sample portion that has been scanned. Such scanning methods are employed in near-field scanning optical microscopy (NSOM), in which the probe tip is brought to within a very small distance of the sample surface, typically less than a wavelength of the light emitted by the light source. NSOM provides very high optical resolution by also employing an aperture in the probe tip that is very small, also typically less than one wavelength. NSOM apparatus is well-known in the art, and is described, for example, in U.S. Pat. No. 4,604,520, issued to W. D. Pohl on Aug. 5, 1986, and in U.S. Pat. No. 4,917,462, issued to A. Lewis, et al. on Apr. 17, 1990.

Figure 2:
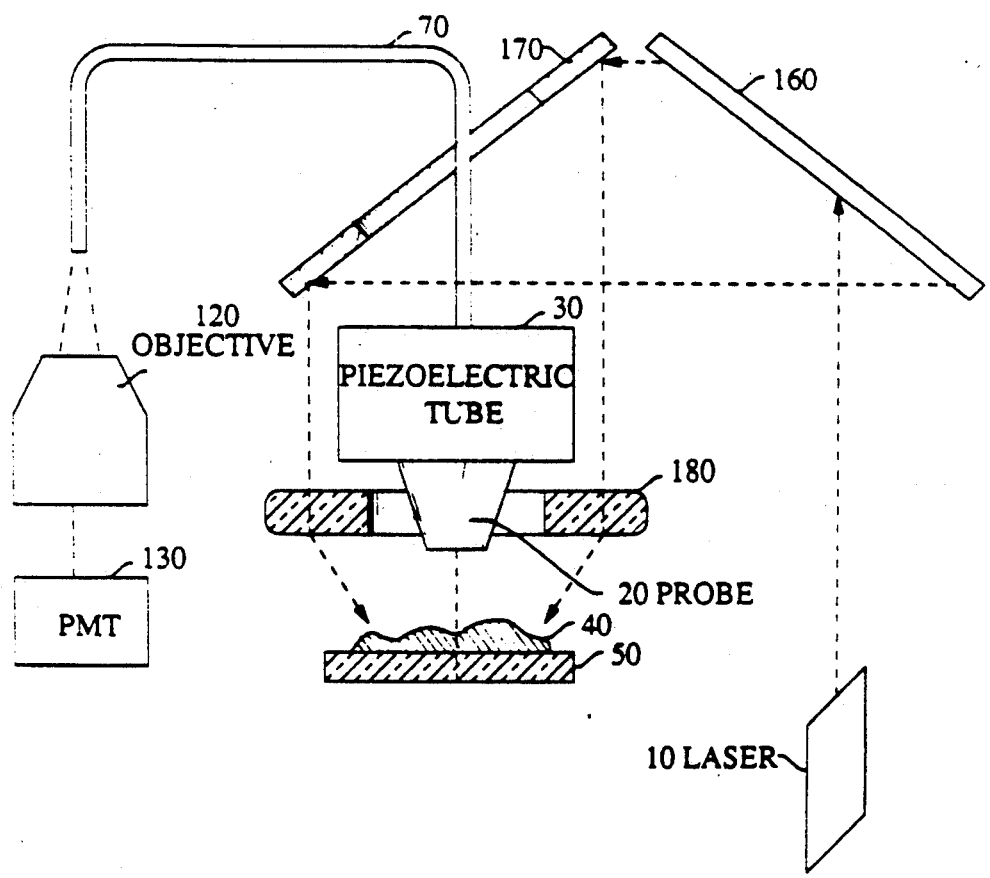
FIG. 2 is a schematic drawing of an alternative, exemplary optical system useful for near-field scanning optical microscopy.

Yet a third possible use for an optical system as described is shown in FIG. 2. In the arrangement of FIG. 2, the probe tip serves as a collector of light rather than as an emitter of light. Such an arrangement is useful, e.g., for NSOM imaging in a so-called "collection" mode. (Illustrated is a collection-reflection mode. A collection-transmission mode is also readily practiced.) Light from light source 10 is directed via tilted mirror 160 and tilted annular mirror 170 to annular objective lens 180. Lens 180 focuses the light onto the sample surface. Light reflected or emitted from the surface is collected by the probe tip and directed via fiber 70 and objective 120 to detector 130. Reflection mode NSOM is described, for example, in U.S. Pat. No. 4,917,462, cited above.

The detector (or, more generally, the transducer) 130 converts the detected light to electrical signals. These signals are readily used to create two-dimensional image on a video display device such as a cathode-ray tube. For such purpose, a scan generator is used to control the displacement of the probe relative to the object and to provide a reference signal for constructing the displayed image. The electrical signals generated by transducer 130 are typically analog signals. These are optionally converted to digital signals before they are displayed. In such a case, a digital memory is optionally provided for storing the digitized signals, and a digital processor is optionally provided to process the digitized signals (for, e.g., image enhancement) before they are displayed.

Figure 3:
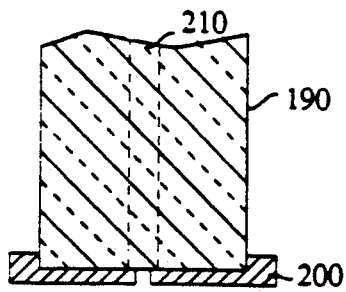
FIG. 3 is a schematic drawing of a prior-art optical fiber probe.
Figure 4:
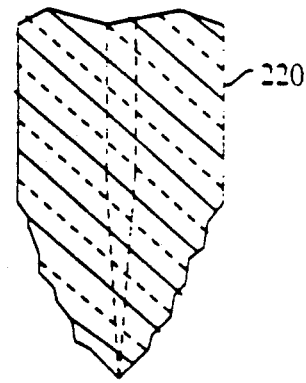
FIG. 4 is a schematic drawing of a prior-art optical fiber probe.

One possible form of probe 20 is a single-mode optical fiber. Optical fiber probes have, in fact, been disclosed in the prior art. FIGS. 3 and 4 show examples of such fiber probes. FIG. 3 shows an untapered, single-mode optical fiber 190, having an annular cap of opaque material, such as metal, deposited so as to cover the tip. The orifice 210 at the center of the annulus defines the optical aperture of the probe. FIG. 4 shows a bare optical fiber 220 that is tapered, for example by chemical etching.

Figure 5:
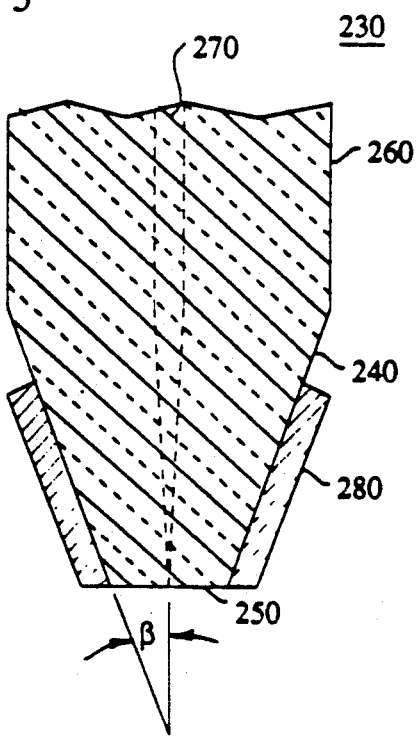
FIG. 5 is a schematic drawing of an optical fiber probe according to one inventive embodiment.

We have discovered that an improved probe 230 is readily made by heating a single-mode optical fiber to soften it, and drawing the softened fiber to form a tapered fiber. After drawing, at least a portion of the tapered fiber must be coated with an opaque material 280, exemplarily metal. With reference to FIG. 5, the tip 240 of such a drawn fiber is tapered at an angle $\beta$, and terminates in an end flat 250.

The optical fiber comprises a cladding 260 and a core 270. Although specific cladding and core compositions are not essential to the invention, an exemplary cladding composition is fused silica, and an exemplary core composition is doped, fused silica having a higher refractive index than the cladding. Although specific cladding and core dimensions are also not essential to the invention, an exemplary core diameter is about 3 $\mu$m, and an exemplary cladding outer diameter is about 125 $\mu$m. One guided mode, the fundamental or $HE_{11}$ mode, is associated with a corresponding single-mode fiber that has not been tapered. Such a mode is characteristic of a cylindrical dielectric waveguide, and for that reason is hereafter referred to as a dielectric mode.

When an optical fiber is tapered by heating and drawing, both the core diameter and the cladding outer diameter are decreased. The fractional change in the core diameter is approximately equal to the fractional change in the cladding outer diameter. (In other words, the cross section of the fiber changes in scale only.) Significantly, the angle at which the core is tapered is substantially smaller than $\beta$. For example, in a linearly tapered fiber having the exemplary dimensions, the tangent of the core taper angle is only 3/125, or 2.4%, times the tangent of taper angle $\beta$. For this reason, even for relatively large values of $\beta$, for example values of 30° or even more, the core will have an adiabatic taper, as discussed below.

In the untapered fiber, the electric field of the dielectric mode is largely confined to the core, and it falls to a very small amplitude, typically less than $10^{-10}$ times the peak amplitude, near the cladding outer surface. That is not necessarily the case in a tapered fiber. As a guided light wave propagates into the taper region, it encounters a progressively narrowing core. Eventually, the core becomes too small to substantially confine the guided mode. Instead, the light wave is guided by the interface between the cladding and the surrounding material, which may be air, or a metal such as aluminum. As discussed above, the core will generally be tapered at a small enough angle for the mode to be adiabatic. By adiabatic is meant that substantially all of the energy of the initial $HE_{11}$ mode remains concentrated in a single mode, and is not coupled into other modes, particularly radiation modes, which are capable of causing optical losses by radiation.

Initially, the guided mode that escapes from the core substantially retains the properties of a $HE_{11}$ mode. In particular, the amplitude of the guided electromagnetic field is relatively small at the cladding outer surface. However, as the fiber diameter continues to decrease, the field amplitude at the cladding outer surface increases relative to the peak amplitude within the fiber. Eventually, the field attains a relatively large amplitude at the cladding outer surface. Such a mode could be guided, for example, by the interface between the cladding and surrounding air. However, such an arrangement is undesirable.

Because the electric field extends significantly outside of the cladding, a significant amount of optical leakage can be expected. This is undesirable because it reduces the efficiency with which light is channeled both to and from the probe tip. Moreover, light leaking from the cladding walls can ultimately fall upon portions of the sample lying relatively far from the probe tip, resulting in unintended exposure of the sample, or in increased background levels at the detector. Furthermore, if the cladding outer walls are surrounded only by air, stray light can enter the fiber, again resulting in increased background levels at the detector (if, for example, the probe is being used to collect light from the sample).

For the above reasons, it is desirable to coat at least the terminal portion of the taper, from which optical leakage is a significant factor, with an opaque material, exemplarily a metal such as aluminum. Significantly, the guided mode in such a metallized portion has characteristics typical of a guided mode in a metal, rather than a dielectric, waveguide. Thus, for example, an initial $HE_{11}$ dielectric mode may be converted to a $TE_{11}$ metallic mode as it approaches and enters the metallized region. Significantly, in a waveguide having an adiabatically tapered core, the $HE_{11}$ mode can couple with relatively high efficiency (typically, greater than 10% efficiency) to the $TE_{11}$ mode. That portion of the fiber in which, if the fiber were bare, the guided mode would have a significant amplitude at the fiber outer surface, but would still retain substantial $HE_{11}$ character is here referred to as the "transition region." In view of the foregoing discussion, it is clearly desirable (although not absolutely required) to metal-coat the fiber throughout the transition region, and from the transition region to the distal end of the fiber. It should be noted in this regard that where a significant amount of optical energy is present in radiation modes, relatively thick metal coatings are required in order to substantially eliminate the possibility of pinhole leaks and, in view of the finite conductivity of any actual coating, the possibility of penetration of the metal by the electromagnetic field. This is undesirable both because the coating thickness may hinder extremely close approach of the probe tip to the sample, and because very thick metal coatings may develop granularity that tends to promote, rather than inhibit, the occurrence of pinhole leaks. By contrast, it is generally expected here that relatively little energy will couple into radiation modes, and therefore relatively thin metal coatings, typically 750–1500 Å, and preferably less than about 1250 Å will generally suffice.

Generally, the guided metallic mode will initially be a propagating mode. However, as the fiber diameter continues to decrease, the guided mode may eventually be transformed to an evanescent mode exhibiting relatively strong attenuation in the propagation direction. Such a transition may be associated with a characteristic quantity here referred to as the "cutoff diameter." The cutoff diameter is the cladding outer diameter of a given tapered waveguide at which the transistion from a propagating to an evanescent mode would occur if the waveguide were coated with an infinitely conductive metal. Generally, for the $TE_{11}$ mode, the cutoff diameter is roughly equal to one-half the guided wavelength. That portion of the fiber extending from the cutoff diameter to the probe tip is here referred to as the "evanescent region."

The cutoff diameter of a $TE_{11}$ mode in, e.g., a circularly cylindrical waveguide is readily predicted from the theory of metallic waveguides as discussed, for example, in J. D. Jackson, *Classical Electrodynamics*, 2d Edition, John Wiley and Sons, Inc., New York, 1975, p. 356. It is equal to the quantity $\chi/k_0 n$, where $k_0$ is the free-space wavenumber of the guided light, n is the refractive index of the waveguide (with reference to the guided mode and wavelength), and $\chi$ is a quantity related to the specific mode that is guided. For a $TE_{11}$ mode, $\chi$ is equal to 1.841. Values of $\chi$ corresponding to other guided modes will be readily apparent to the ordinarily skilled practitioner.

It should be noted in this regard that the transformation of the fundamental dielectric mode to the $TE_{11}$ metallic mode may be incomplete. Some finite portion of the energy of the dielectric mode may be coupled into metallic modes other than the $TE_{11}$ metallic mode. However, the $TE_{11}$ mode generally experiences less attenuation, in the evanescent region, than any of the other metallic modes. For that reason, a light wave that has traversed the evanescent region substantially contains only the $TE_{11}$ metallic mode. (It should further be noted that because of the finite conductivity of actual metal coatings, a perturbed $TE_{11}$ mode is expected; i.e., a mode in which the electric field has a small longitudinal component.)

Because substantial attenuation takes place in the evanescent region, it is desirable to make that region as short as possible. However, other factors, to be discussed below, may militate for differing evanescent lengths in differing applications.

It is desirable for the cladding outer surface in the tapered portion of the fiber to be substantially smooth in order to reduce scattering of light from the $HE_{11}$ mode near the cladding outer surface, and in order to receive a metal coating that is relatively thin (preferably, less than about 1500 Å thick) and also substantially free of defects capable of leaking optical radiation. A cladding surface is here considered to be substantially smooth if no surface texture is apparent on a scale of more than about 50 Å as observed in a scanning electron micrograph (SEM). Surfaces of such desirable smoothness are readily produced by heating and drawing the fiber.

It is desirable for the end flat to be substantially planar, and to be oriented substantially perpendicular to the axial direction of the fiber. The end flat is here considered to be substantially planar if, over the surface of the end flat, examination by SEM reveals no deviation from planarity greater than about 100 Å by any feature of any lateral extent.

It is desirable for the edges of the end flat to be relatively sharply defined. The edges are here considered to be sharply defined if examination by SEM reveals an average radius of curvature, at the edge, of less than about 100 Å. End flats of such desirable planarity, and having edges of such desirable sharpness, are also readily produced by heating and drawing the fiber.

Figure 6:
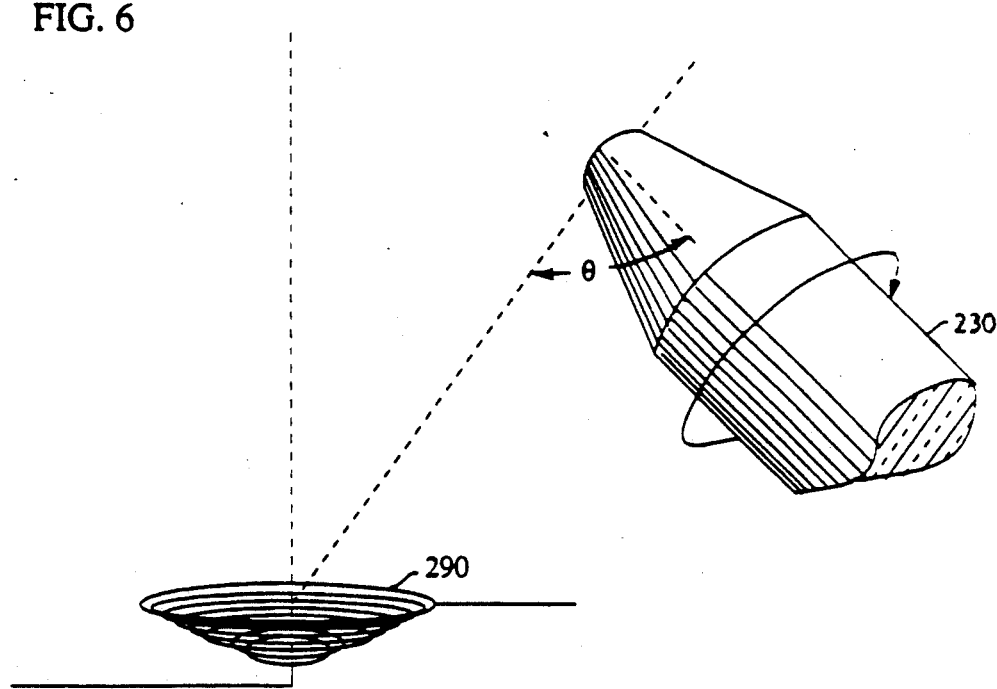
FIG. 6 depicts an exemplary method for metallizing an optical fiber probe.
Figure 7:
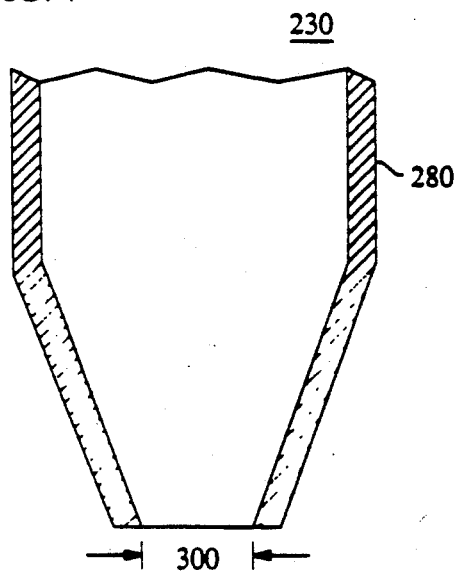
FIG. 7 is a schematic depiction of an optical aperture according to one inventive embodiment.

One method for metal-coating the terminal portion of the fiber (preferably including at least the transition region, as noted above) involves the use of an evaporation source of, e.g., aluminum. As shown in FIG. 6, the fiber 230 is not oriented end-on toward the source 290 during evaporation and deposition of the aluminum. Instead, the probe end of the fiber is pointed away from the source, such that the end flat lies in a shadow relative to the direction of incidence of the bombarding metal. Typically, the fiber axis is inclined at an angle $\theta$ of about 75° relative to a line drawn from the source to the fiber tip. During deposition, the fiber is rotated about its own axis in order to uniformly coat all sides of the fiber. When such a method is employed, a coating is readily produced that smoothly covers the cladding outer surface, but leaves the end flat substantially bare of any metal. With reference to FIG. 7, the above-described method is useful for producing a probe in which the optical aperture 300 corresponds to the entire surface of the end flat. Because the spatial resolution of the probe is determined mainly by the aperture diameter, it is desirable, for high-resolution applications, to make the end flat diameter quite small. Thus, the end flat diameter in such a probe would generally be made smaller than the cutoff diameter. For example, the cutoff diameter for 5145 Å light from an argon ion laser is typically about 2000 Å in a fiber of the exemplary dimensions discussed above. A typical, corresponding end flat diameter is about 500–1000 Å, and end flats as small as about 200 Å, or even smaller, are readily made by heating and drawing the fiber. In general, the average thickness of the aluminum layer is preferably not less than about 750 Å, because substantially thinner layers may be subject to excessive optical leakage. (If the probe is used for both illuminating the object and collecting light from the object, an even smaller thickness may be acceptable.) The thickness is preferably not greater than about 1500 Å, because it is desirable to minimize the total diameter of the probe tip and to make the coating as smooth as possible. The total diameter is the sum of the end flat diameter and the metal thicknesses bounding the end flat at diametrically opposite positions. It is desirable to minimize this total diameter in order to provide a probe tip that can be inserted within relatively narrow cavities or crevices in the sample surface, and that can, more generally, penetrate as deeply as possible into the near field of the sample.

Significantly, a probe of the above-described type has an evanescent region extending from the cutoff diameter to the end flat. Such an evanescent region is relatively long, by comparison to an alternate design to be described below. For example, with a cutoff diameter of 2000 Å, an end flat diameter of 500 Å, and a taper angle of 15°, the evanescent length is 5600 Å. In such a distance, a significant amount of attenuation may take place. Consideration of the attenuation militates for making the taper angle as large as is feasible in order to shorten the evanescent length. However, it must also be considered that a narrower taper angle makes it easier to penetrate crevices and to approach step-like surface features more closely.

According to a preferred method for tapering the fiber, the fiber is first mounted in a commercial pipette puller. The fiber is heated prior to and during drawing. An exemplary heat source is a carbon dioxide laser. The fiber is drawn until it breaks. Controllable parameters include the incident illumination intensity (which determines the heating rate), the pulling force applied to the fiber ends, and the number of individual pulling steps that are applied. Generally, the fiber is finally broken by a "hard pull," that is, a pulling step conducted with sharply increased force. The velocity of the fiber ends at the moment of application of the hard pull is also controllable, as is the time delay between cessation of heating and application of the hard pull.

We have discovered that a given set of process parameters produces probes having highly reproducible characteristics. The taper angle is readily increased by any selection or combination of reducing the heating rate, reducing the pulling force, pulling in multiple steps, or reducing the extent of the heated region. The end flat diameter is readily increased by increasing the heating rate, or increasing the pulling force, or both. In addition, the use of a fiber having a higher temperature glass composition provides a bigger taper angle and a smaller tip. Desirable combinations of process parameters will be readily apparent to the ordinarily skilled practitioner after minimal experimentation.

Figure 8:
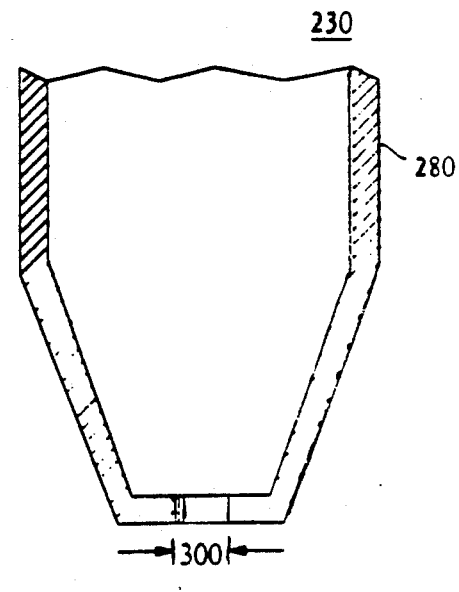
FIG. 8 is a schematic depiction of an alternative optical aperture.

An alternative type of probe is illustrated in FIG. 8. In this type of probe, the metal coating is deposited over the end flat as well as on the cladding outer surface. As discussed above, the metal thickness on the cladding outer surface is desirably about 750–1500 Å thick. The metal layer overlying the end flat is desirably about 250–500 Å thick because it needs to be thick enough to substantially eliminate stray light, but also as thin as practicable in order to minimize the evanescent length. The optical aperture 300 in this case corresponds, not to the entire end flat, but only to a portion of the end flat. The metal layer overlying the end flat is formed into an annulus having an opening which defines the optical aperture. Significantly, the opening may be centrally located on the end flat, or, alternatively, it may be displaced from the center of the flat. A non-central aperture may be desirable where multiple modes are expected to be present in the tip region. Because not all modes will couple efficiently to a centrally located aperture, a non-central aperture in such a case may provide more efficient output coupling. In particular, a non-central aperture is expected to give the optimal output coupling for the $TE_{11}$ mode.

The central opening is formed, for example, by initially providing a fiber that incorporates an embedded rod of glass that is more rapidly etched than the host glass of the fiber. (An example is borosilicate glass embedded in fused silica.) The end of the fiber is exposed to a chemical etchant after pulling but before the fiber is metallized. The etchant produces a cavity in the end flat. The cavity is shadowed during metallization of the end flat, resulting in an opening in the metal layer.

A typical aperture made by this method is about 200–2000 Å in diameter, and the same method is readily employed to form apertures even larger or smaller.

The metal coating is exemplarily deposited from an evaporation source, as discussed above in connection with the bare-tipped probe. However, two separate deposition steps are employed: one for coating the the cladding outer surface, as described above, and a second step at a different fiber orientation for coating the end flat.

Because in this type of probe, the aperture is not determined by the end flat diameter, it is not generally necessary for the end flat diameter to be smaller than the cutoff diameter, even for high-resolution applications. Accordingly, in order to minimize attenuation, it is desirable for the end flat diameter to be, approximately, at least the cutoff diameter. However, as discussed above, it is desirable to minimize the total probe tip diamter in order to be able to penetrate crevices. For this reason, the end flat diameter is preferably also not substantially greater than the cutoff diameter.

It should be noted in this regard that the aperture diameter is generally smaller than the cutoff diameter, and therefore the central opening in the metal layer overlying the end flat defines a metallic waveguide in which the optical field is evanescent. However, because the coating is typically only about 500 Å thick or less, the evanescent length is much smaller than it is in the case of the bare-tipped probe discussed previously. Clearly, in order to minimize attenuation, it is desirable to make the metal coating on the end flat as thin as is practicable. An acceptable range for metal thicknesses on the end flat is about 250–500 Å, and, as noted, 500 Å is typical.

We have calculated the ideal power attenuation expected in the evanescent portion of a bare-tipped probe. The corresponding power transmission coefficient is conveniently expressed in terms of $\chi$, which, as noted above, is a characteristic of the guided mode, the taper angle $\beta$, and a dimensionless parameter $\alpha$, which is defined by $$\alpha = \chi/nk_0 a,$$

where a is the aperture diameter, and as noted above, $k_0$ is the free-space wavenumber of the guided light, and n is the relevant value of the waveguide refractive index. It is helpful to note that $\alpha$ is equal to the ratio of the cutoff diameter to the aperture diameter. When expressed in decibels, the power transmission coefficient corresponding to ideal evanescent attenuation is given by:

$$T_{ev} \text{(db)} = 8.68(\chi/\tan\beta)\left[\frac{\sqrt{\alpha^2 - 1}}{\alpha} - \ln(\alpha + \sqrt{\alpha^2 - 1})\right]$$

We have succeeded in making probes, having various values of $\alpha$ ranging between 1 and 10, and various values of $\beta$ ranging between 5° and 20°, in which the overall measured power transmission coefficient falls below $T_{ev}$ by no more than 10 dB.

At least for values of $\alpha$ ranging between 2 and 8, $T_{ev}$ may be roughly approximated by $-2\chi\alpha/\tan\beta$ dB. Accordingly, we have succeeded in making probes for which the overall measured power transmission coefficient, denoted T, satisfies $$T\text{(db)} > -(2\chi\alpha/\tan\beta) - 10.$$

The inventive optical system is useful, inter alia, as a manufacturing tool. For example, the probe is readily used to conduct actinic radiation from a light source to a small region of a workpiece surface situated adjacent the optical aperture of the probe. Thus, for example, a workpiece surface may be coated with a photosensitive layer such as a photoresist, and a pattern formed in the layer by moving the probe relative to the layer while transmitting light through the probe such that light exits the aperture and falls on the layer, thereby exposing the layer. Additional steps are then readily performed, leading, for example, to the completion of an article of manufacture. Exemplarily, the article of manufacture is a semiconductor integrated circuit, and the additional steps include developing the photoresist and subjecting the resist-coated surface to an etchant such that a layer underlying the photoresist is patterned. Significantly, not only semiconductor wafers, but also glass plates intended for use as photolithographic masks, are readily patterned in this fashion.

In an alternative process, actinic radiation from the probe is readily directed to a workpiece surface in order to cause deposition of material on the surface. For example, the surface may be exposed to an organometallic vapor or solution. Actinic radiation impinging on the surface may excite local decomposition of one or more constituents of the vapor or solution, producing, e.g., a metallic residue that adheres to the surface.

Figure 9:
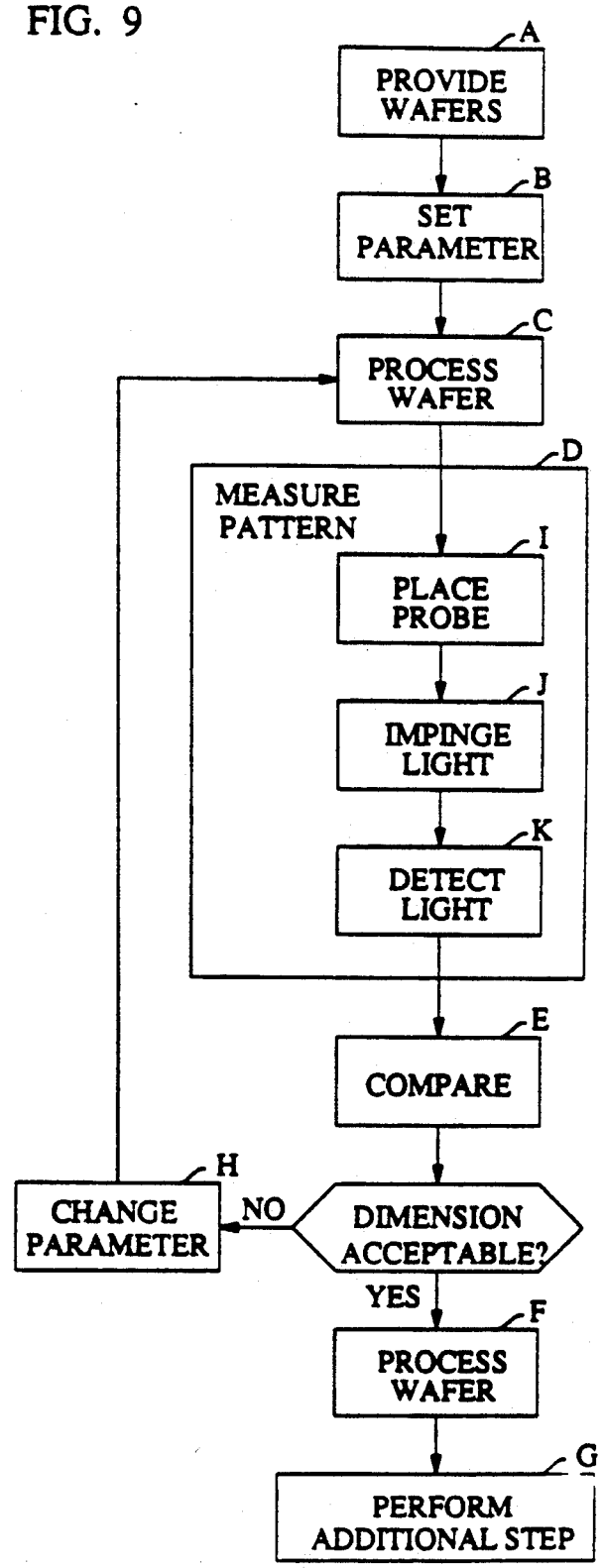
FIG. 9 is a flowchart illustrating a manufacturing process according to one inventive embodiment.

The inventive optical system is also useful as an inspection device on a manufacturing line. For example, with reference to FIG. 9, in the manufacture of semiconductor integrated circuits, a semiconductor wafer is often provided (Step A), having a surface that is patterned at one or more stages of the manufacturing process. The patterns that are formed have characteristic dimensions, sometimes referred to as "line widths," that must generally be kept within close tolerances. The inventive optical system is readily used for measuring (Step D) line widths, such as the width of metallic conductors on a wafer, or the length of gates formed in metal-oxide-semiconductor (MOS) structures on a wafer. Such line widths can then be compared (Step E) with desired values. Process parameters, exemplarily lithographic exposure times or etching times, which have been initially set (Step B) are readily adjusted (Step H) to bring the measured dimensions within the desired tolerances. Additional steps (Step G) toward completion of a manufactured article are then performed. The measuring step includes situating the probe adjacent the patterned surface (Step I) and impinging (Step J) light upon, and detecting (Step K) light from the surface such that the light source and detector are optically coupled via the inventive probe, which is substantially as described above.

The inventive optical system is also useful for inspecting bit patterns in magnetic digital storage media such as magnetic disks. Because magnetic storage media generally exhibit a Faraday rotation of polarized light, the bit patterns, which are characterized by modulated magnetization directions, are readily visualized by inspection using, e.g., crossed polarizers. Thus for example, the inventive optical system may be used for reflection-mode imaging of the medium, using a polarized light source and including a polarizing filter in front of the detector. In a manufacturing process that involves impressing such media with bit patterns having predetermined properties, relevant process parameters may be adjusted to bring the detected bit patterns into conformity with the desired patterns.

In at least some cases, the laser light source is itself a source of polarized light. In other cases, it may be desirable to pass light from the source through a linearly polarizing film. Before such light is coupled into optical fiber 70 (see FIG. 1), it is often useful to pass it through a half-wave plate and then a quarter-wave plate. The orientations of these plates are readily adjusted in order to compensate for birefringence in the optical fiber. (A polarization preserving fiber may be useful, but is not necessary.) The linearly polarized component of light emerging from the fiber is optimized by, e.g., visually detecting it through a second linearly polarizing film while adjusting the half-wave and quarter-wave plates.

Other applications of the inventive optical system for manufacturing and inspection will be readily apparent to the skilled practitioner.

For example, the inventive optical system is also useful for impressing digital data for storage on an optical or magnetic storage medium, and for reading such stored data from the storage medium. For example, it is well known that data can be recorded on magnetizeable metallic films in the form of patterns of spots having local magnetization that differs in direction from the magnetization of surrounding film portions. This data storage technology is described, for example, in R. J. Gambino, "Optical Storage Disk Technology," *MRS Bulletin* 15 (April 1990) pp. 20–24, and in F.J.A.M.

Greidanus and W. B. Zeper, "Magneto-Optical Storage Materials," *MRS Bulletin* 15 (April 1990) pp. 31-39.

A typical magnetic storage medium is a layer which comprises an amorphous alloy of one or more of the rare-earths and one or more of the transition metals. (alternative magnetic storage materials include cobalt-platinum or cobalt-palladium multilayer films, and magnetic oxide materials such as ferrites and garnets.) A spot representing, e.g., a bit of digital data, is written by exposing the medium to a magnetic field and optically heating the spot area above the Curie temperature or above the compensation point of the medium. (In some cases, the internal demagnetizing field of the medium is sufficient to cause local reversal of magnetization, and an external field need not be applied.) Such spots are conventionally made about 1 $\mu$m in diameter. However, the inventive optical system is readily employed to make smaller spots, exemplarily spots having diameters of about 0.2-0.5 $\mu$m, and even as small as 0.06 $\mu$m or less. Such smaller spots can also be read by the inventive optical system.

In a currently preferred embodiment, the magnetic storage medium is a thin, amorphous film of an alloy comprising at least one rare earth and at least one transition metal. An exemplary such alloy is terbium-iron. The aperture of the near-field probe is situated less than about one illumination wavelength from the surface of the medium. (If larger spots are desired, the probe is readily positioned more than one wavelength from the medium.) The illumination wavelength is selected to give adequate heating to the medium. For example, a terbium-iron film is readily heated by a dye laser which is pumped by a YAG laser and emits roughly nanosecond pulses at a wavelength of roughly 600 nm. Light from the laser is directed into the inventive probe via an optical fiber, and is impinged from the probe tip onto the recording medium. A typical, local temperature change required to write a spot is about 150° C. Although writing can be achieved using either a continuous or pulsed laser for illumination, a pulsed laser is preferable in order to relax the average power requirements of the laser while heating a relatively small spot.

Significantly, the invention is intended to encompass not only magnetic film recording media, but also other media that are capable of being written by an illumination source. Such media include, for example, polycrystalline films (of, e.g., tellurium-doped indium antimonide) that are locally heated to, e.g., a temperature which exceeds the melting point of the film by a laser pulse and rapidly quenched to an amorphous state. The cooling rate can be influenced by, e.g., appropriately shaping the time dependence of the laser pulse.

It should be noted in this regard that direct optical heating is only one of several possible mechanisms for the local heating that results in the recording of data in magnetic or other storage media. For example, indirect optical heating may also be useful for this purpose. By indirect heating is meant heating of the entire probe tip by optical absorption in, e.g., the metal cladding. Heat is then transferred through a projection on the probe tip to a localized spot in the storage medium. Other examples of potentially useful heating mechanisms are ohmic heating, in which an electric current is passed through the probe tip, and field-emission heating, in which a difference in electrical potential is created between the probe tip and the surface of the storage medium.

Spots representing recorded data are typically written in a track in the recording medium. Such a track extends, e.g., circumferentially on a rotating disk. The diameters of spots written in accordance with the instant invention are typically much smaller than the width of such a track. Accordingly, multiple such spots are advantageously written in bands extending substantially transversely across the track. One advantage of the invention is that the spots in such bands can be read simultaneously by a linear array of inventive near-field probes.

In a currently preferred method of reading a pattern impressed on a magnetic film recording medium, linearly polarized light emitted by the inventive probe is transmitted through the medium, and conventional means are used to collect a portion of such transmitted light and to polarization analyze it. For reading, preferred wavelengths are those having a maximal optical response (i.e., maximal rotation of the direction of polarization of the light as it traverses the magnetic medium). For transition-metal-rare-earth media, such wavelengths will typically lie in the near-infrared or visible spectrum.

In an alternate embodiment, the probe is used both to impinge polarized light onto the surface of the medium, and to collect a portion of such light that is reflected from the surface. As a result of either transmission through, or reflection from, a magnetized spot in the medium, a polarization rotation of, typically, about 0.5° is produced. The effect of such rotation is to modulate the intensity of light transmitted through an analyzer and subsequently detected. Such modulation is readily decoded to reproduce the information recorded in the medium. As is well known, such information may, for example, be recorded sound, images, text, or digital data.

In alternate embodiments, such as those involving phase changes, modulation is typically provided by changes in reflectivity, rather than by polarization rotation. Such changes are also readily detectable using the inventive probe to collect reflected light.

The inventive microscope is also advantageously employed for imaging applications in biological research and clinical medicine. In particular, the inventive microscope overcomes, in at least some cases, the problem of low signal level that often detracts from the usefulness of prior-art NSOM systems for medical and biological imaging. Thus, for example, the inventive microscope is readily used to image sectioned samples of biological tissue in order to find and identify physical pathologies in the tissue. In a similar manner, the inventive microscope is readily used to examine the distribution in sectioned tissue samples of materials that are detectable by their inherent appearance or fluorescence, as well as materials that are labeled by, e.g., fluorescent dyes.

The inventive microscope is also useful, in genetic clinical and research applications, for imaging chromosomes while they are in, e.g., the metaphase state. In particular, chromosomes or portions of chromosomes that are labeled with fluorescent material are readily identified using the inventive microscope. Methods of fluorescent labeling, which generally involve reacting cell nuclear material with material that includes fluorophores, are well-known in the art and need not be described in detail herein.

Fluorescent imaging is readily achieved using the microscope in either an illumination mode (FIG. 1) or a collection mode (FIG. 2). In the former, electromagnetic radiation capable of inducing the sample to emit fluorescent light impinges on the sample from the probe and the resulting fluorescence is collected by, e.g., a conventional microscope objective. In the latter, the exciting radiation is conventionally impinged on the sample, and the fluorescent light is collected by the probe.

As noted, a preferred probe 20 (see FIG. 1) is made by tapering a single-mode optical fiber. It should be noted that in at least some cases a useful probe can also be made by tapering and coating a multiple mode fiber. Depending on the dimensions of a multiple mode fiber (relative to the guided wavelength), a greater or lesser number of modes will be guided. In general, it is expected that the fewer the number of guided modes (i.e., the more closely the fiber resembles a single-mode fiber), the greater will be the signal-to-noise ratio achieved for a given aperture.

Also as noted, an exemplary opaque coating for the probe is a metal such as aluminum. More generally, an appropriate coating is one consisting of a material in which the guided radiation has a low penetration (skin) depth. Aluminum is a preferred material when the radiation lies in, e.g., the visible spectrum, but semiconductors such as silicon may be preferably where, e.g., ultraviolet radiation is to be guided.

A tapered optical fiber is only one example of a broader class of optical waveguides that can be used as probes in accordance with the invention. The general characteristic of such probes is that they have a portion distal the probe tip which supports at least one propagating, dielectric mode of electromagnetic radiation, and a portion proximal the probe tip at least part of which supports evanescent or propagating metallic modes. Such a probe has a core region and at least one cladding region. The dielectric mode or modes are determined by the boundary conditions at the interface between the core and the cladding. By contrast, the metallic mode or modes are defined by the boundary conditions at least at one metal layer (or, more generally, an opaque layer having a penetration depth much smaller than the wavelength of the guided radiation) which is situated adjacent the cladding, distal the core region.

At least a portion of the probe is tapered at an angle $\beta$, and the tapered portion includes both dielectric and metallic waveguide regions. At least partly as a result of the taper, an electromagnetic wave propagating in the probe is transformed between dielectric and metallic modes as it passes between the respective regions. The angle $\beta$ is "adiabatic" in the sense that the dielectric region of the waveguide guides light of the low-order dielectric modes to the metallic region with high efficiency. If, by contrast, the taper were too sharp (i.e., $\beta$ too large), a substantial fraction of the radiation injected into these modes in the dielectric region would be lost to retroreflection and scatter.

It is preferable for the dielectric region to support relatively few, e.g., less than 10, propagating modes, and more preferably, only one such mode. It is an advantageous property of dielectric waveguides that although the injected radiation can be efficiently coupled into the cladding, which may present a relatively large cross section to the radiation source, the injected radiation can be limited to only one or a few propagating modes that are bound to the core. By contrast, more than 10, and even as many as one million or more, propagating modes will typically be excited when radiation is injected into a hollow metal waveguide, or a metal waveguide filled with a single, dielectric material, which has a diameter of, e.g., 100 $\mu$m. When such a waveguide is tapered, a substantial fraction of the propagating radiation is likely to couple into radiative modes which are retroreflected, absorbed, or scattered out of the waveguide. Consequently, this fraction fails to propagate to the metallic portion, where the surviving light is confined to subwavelength dimensions.

Each propagating dielectric mode has a typical electric field profile. The amplitude of this profile, at the cladding outer surface, is initially insignificant relative to the amplitude at the core, even if a metal layer or coating is absent. This condition assures that dielectric, and not metallic, modes are present. In the absence of a metal coating or layer, the amplitude at the cladding outer surface increases within the taper region as the width or diameter of the waveguide decreases. As a consequence, there is some part of the taper region where the boundary conditions imposed by the metal layer or coating become comparable in importance to the dielectric boundary conditions. This condition defines a transition region. At one end of the transition region, the mode is predominantly dielectric in character, and at the other end it is predominantly metallic in character. We have observed efficient coupling of energy at least between the lowest propagating dielectric mode and the least evanescent metallic mode, which we currently attribute to a large overlap integral between these modes.

It is important for the waveguide to be hybrid in character, with a dielectric portion as well as a metallic portion. The dielectric portion makes it possible to efficiently couple radiation from a conventional light source into a few well-confined dielectric modes in the probe, and/or to couple radiation from a few such modes into a conventional light detector. The dielectric portion also provides substantially lossless transmission of radiation through the tapered region during, e.g., illumination-mode operation. Near the tip, by contrast, the waveguide should be metallic in character, because a metallic waveguide provides much better confinement of the electromagnetic field. Whereas the optimum confinement in a purely dielectric waveguide (as defined by the full width at half-maximum of the components of the electromagnetic field) is about $\lambda/2$ (i.e., one-half the guided wavelength), a metallic waveguide can provide confinement as good as $\lambda/10$ or even better. Because light is efficiently coupled into the waveguide and efficiently transferred between the dielectric and metallic portions, relatively large signal-to-noise ratios can be achieved. This, in turn, makes it feasible to use relatively small apertures, thereby achieving relatively high image resolution. Moreover, coupling into a few well-confined modes tends to suppress radiative losses through pinholes in the opaque layer or coating, which can otherwise result in an undesirably high background radiation level. This enhances the reliability of processes for manufacturing probes.

One example of a waveguide useful in this regard is a modified optical fiber probe in which a conductive wire is situated on the longitudinal axis in the terminal metallic portion, such that a coaxial waveguide structure is formed. This structure is capable of supporting at least one propagating mode.

One example of a waveguide structure useful in this regard, alternative to an optical fiber waveguide, is a thin-film waveguide disposed on a planar substrate. We believe that useful embodiments of the inventive probe can be based on this as well as other alternative waveguide structures, provided that such structures include the general characteristic described above.

Probes based on optical fibers, thin-film waveguides, or other waveguiding structures will typically terminate in an end flat, with an optical aperture defined in the end flat. However, in some cases it may be desirable to admit or emit light through an aperture formed at or near the edge of the terminal end flat. Such an aperture is readily formed adjacent to the end flat by, e.g., overcoating the end flat with opaque material, and then removing opaque material down to an appropriate plane. Such a plane will be inclined relative to the waveguide longitudinal axis, and will intersect the end flat at or near an edge thereof.

A thin-film waveguide disposed on a planar substrate has several advantageous properties. For example, a probe based on this kind of waveguide can be mass produced in large groups on single substrates such as silicon wafers using, e.g. lithographic processing, resulting in reduced unit cost. Moreover, probes of this kind can be manufactured in large arrays for use, e.g., in applications which require parallel reading or writing operations.

Such a waveguide would comprise vitreous or non-vitreous material, and would include a core layer, a cladding layer underlying the core layer, and, optionally, a cladding layer overlying the core layer. (In some embodiments, a portion of the upper surface of the core layer may be effectively in direct contact with air or the ambient atmosphere or vacuum, which, by virtue of the refractive index difference across the contacting surface, would behave like an upper cladding.)

Figure 10:
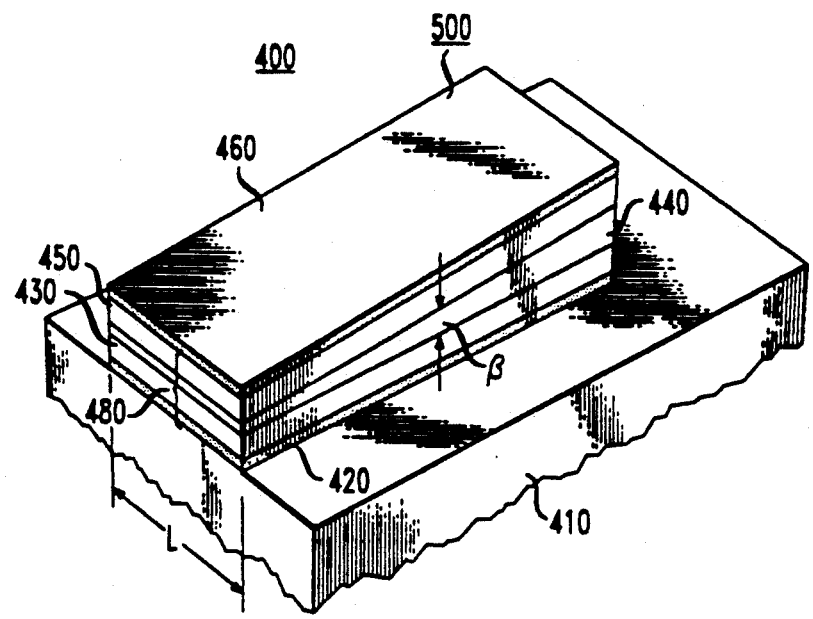
FIGS. 10 and 11 schematically depict alternate embodiments of the inventive probe in a planar waveguide instead of an optical fiber.

An example of a so-called "channel waveguide" 400, formed, e.g., on a planar surface of a silicon substrate 410, is illustrated in FIG. 10. Well-known methods of material deposition, such as chemical vapor deposition or sputter deposition, are used to form layers 420–460. The lateral extent of one or more layers is exemplarily defined by lithographic patterning and etching. The deposited layers include lower opaque layer 420 and upper opaque layer 460, which are composed of a material having a relatively short penetration depth for the electromagnetic radiation that is to be guided. (By a "short" penetration depth is meant a depth which is much smaller than the relevant wavelength $\lambda$, exemplarily, $\lambda/10$ or less.) The opaque layers are analogous to layer 280 of FIG. 5. The deposited layers further include lower cladding layer 430, optional upper cladding layer 450, and core layer 440. Exemplary compositions for the respective layers are: for opaque layers, aluminum (desirable for relatively high opacity) or chromium (desirable for relatively high melting point); and for the core and cladding layers, silica-based glass.

In a planar waveguide of the kind described herein, the $TE_{01}$ mode will generally be the sole propagating metallic mode if the width W of the waveguide is less than $\lambda/2n$, where $\lambda$ is the guided wavelength and n is the refractive index of the cladding. (By the width W is meant the thickness of the combined core and cladding layers.) This mode will be the only mode of practical significance in the metallic portion of the waveguide. This mode will be strongly linearly polarized, with the electric field vector oriented perpendicular to the metal coating. The electromagnetic field components of this mode are described, e.g., in J. B. Marion and M. A. Heald, *Classical Electromagnetic Radiation*, 2d. Ed., Academic Press, New York (1980) p. 191.

For a sufficiently small core in the dielectric region, there will generally be two propagating modes, namely the $TE_0$ and the $TM_0$ modes. The electromagnetic field components of these modes are described, e.g., in A. W. Snyder and J. D. Love, *Optical Waveguide Theory*, Chapman and Hall, London (1983), p. 242.

At least a portion of core layer 440 is adiabatically tapered at angle $\beta$. The taper is exemplarily formed by varying, according to longitudinal position, the exposure time of the substrate to the source of depositing core material and the source of depositing cladding material. (Analogously to the tapered fiber probe, it is preferable to maintain an approximately constant ratio of core thickness to cladding thickness in the taper region.) The waveguide terminates in an end flat 480, which may be defined by the edge of the substrate during the deposition process or, alternatively, by cutting and polishing the substrate after deposition.

Figure 11:
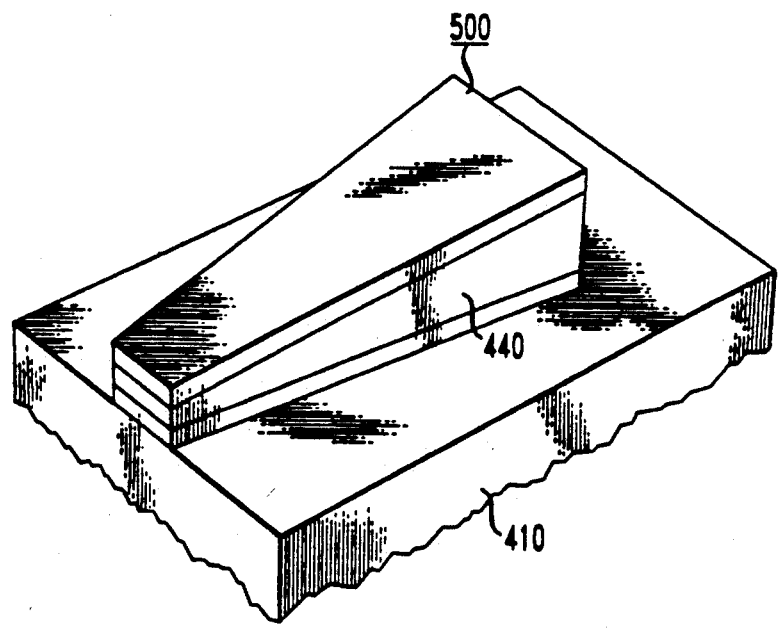

The optical aperture is defined in the end face by the spacing between the opaque layers. As long as the transverse length L of the aperture is greater than $\lambda/2n$, where $\lambda$ is the guided wavelength and n is the refractive index of the cladding, the terminal portion of the waveguide will support at least one propagating metallic mode, regardless of the width W of the waveguide. As a consequence, the waveguide can additionally be tapered in the transverse direction, as long as the relation $L > \lambda/2n$ is satisfied. This additional taper, depicted in FIG. 11, is exemplarily formed by lithographically patterning and etching the waveguide.

As noted, the metallic waveguide portion will typically have a single propagating mode that is linearly polarized. This polarization effect is very useful for magneto-optical imaging, in which image contrast is produced as a result of the rotation of the plane of polarization of light in an appropriate medium by magnetic fields.

Appropriate optical elements are readily provided for coupling electromagnetic radiation into or out of probe 400 from or to, e.g., an optical fiber. However, in preferred embodiments, an optical fiber is not used. Instead, a diode laser is coupled to rear face 500 either directly, or thorugh a planar waveguide. It is expected that mode coupling from probe 400 to a diode laser will be more efficient than mode coupling to an optical fiber because like the probe, a diode laser has a linear geometry, whereas an optical fiber has a circular geometry.

A probe such as probe 400 will be especially useful for applications which require miniaturization of components. Those applications might include, for example, consumer electronics which read data or audio or video information from a dense optical or magneto-optical storage medium.

EXAMPLE

A 3-$\mu$m, single-mode fiber (FS-VS-2211) having a 450 nm cutoff, was drawn in a Mod. P-87 micropipette puller manufactured by Sutter Instruments, while heating the fiber with a 25-watt, 3-mm spot from a 25-watt carbon dioxide laser. The micropipette puller was programmed to provide a hard pull at a setting of 75 (range 0–255), a "velocity at pull" at a setting of 4 (range 0–255), and a time delay of 1 (range 0–255). The tip properties that were obtained were: a 12° taper angle, a 670-Å-diameter end flat, and a value for $\alpha$ of about 3. One fiber end was placed in a rotator and evaporation coated with about 1260 Å of aluminum at a base pressure of about $10^{-6}$ torr. The tapered end was then mounted in a piezoelectric tube in the optical arrangement of FIG. 1. One milliwatt of 514.5-nm light from an argon ion laser was coupled into the fiber. The optical power output at the fiber tip was measured to be about 1.1 nanowatt, corresponding to an overall power transmission coefficient of about −60 dB. When used to form an image of a sample surface, the probe provided a spatial resolution of about 25 nm.

We claim:

1. A method for manufacturing an article, comprising the steps of:
   a) providing a multiplicity of semiconductor wafers, each wafer having a surface to be patterned;
   b) setting at least one process parameter;
   c) processing at least a first wafer according to the process parameter such that a pattern is formed on the surface of the wafer, the pattern having a characteristic dimension;
   d) measuring the characteristic dimension in at least the first wafer;
   e) comparing the characteristic dimension to a predetermined range of values;
   f) if the characteristic dimension lies outside of the predetermined range of values, changing the process parameter to bring the characteristic dimension within the predetermined range of values;
   g) after (f), processing at least a second wafer according to the process parameter; and
   h) performing, on at least the second wafer, at least one additional step toward completion of the article; wherein the measuring step comprises:
   i) impinging incident light having at least one incident wavelength on the wafer surface such that at least a portion of the incident light is reflected from the wafer surface;
   j) admitting a portion of the reflected light into a waveguiding body through an aperture that is distant from the wafer surface by no more than the incident wavelength, and that is smaller, in at least one lateral dimension, than the incident wavelength;
   b) exciting a guided metallic mode of electromagnetic radiation within the waveguiding body;
   c) adiabatically converting a portion of the reflected light from the metallic mode to at least one guided dielectric mode; and
   d) detecting the adiabatically converted light.

2. A method for manufacturing an article, comprising the steps of:
   a) providing a multiplicity of semiconductor wafers, each wafer having a surface to be patterned;
   b) setting at least one process parameter;
   c) processing at least a first wafer according to the process parameter such that a pattern is formed on the surface of the wafer, the pattern having a characteristic dimension;
   d) measuring the characteristic dimension in at least the first wafer;
   e) comparing the characteristic dimension to a predetermined range of values;
   f) if the characteristic dimension lies outside of the predetermined range of values, changing the process parameter to bring the characteristic dimension within the predetermined range of values;
   g) after (f), processing at least a second wafer according to the process parameter; and
   h) performing, on at least the second wafer, at least one additional step toward completion of the article; wherein the measuring step comprises:
   i) admitting incident light having at least one incident wavelength into an optical waveguiding body such that a guided dielectric mode is excited within the waveguiding body;
   j) adiabatically converting a portion of the incident light from the guided dielectric mode to a guided metallic mode; and
   k) emitting a portion of the adiabatically converted light from an aperture that is distant from the wafer surface by no more than the incident wavelength, and that is smaller, in at least one lateral dimension, than the incident wavelength, the emitting step carried out such that at least a portion of the emitted light is reflected from the wafer surface; and
   l) detecting at least a portion of the light reflected from the wafer surface.

* * * * *

UNITED STATES PATENT AND TRADEMARK OFFICE
Certificate

Patent No. 5,288,999            Patented: February 22, 1994

On petition requesting issuance of a certificate for correction of inventorship pursuant to 35 U. S. C. 256, it has been found that the above-identified patent, through error and without deceptive intent, improperly sets forth the inventorship.

Accordingly, it is hereby certified that the correct inventorship of this patent is: Robert E. Betzig, New Providence, N.J. and Jay K. Trautman, Chatham, N.J.

Signed and Sealed this Twenty-Third Day of September, 1997.

EDWARD P. WESTIN
*Supervisory Patent Examiner*
Patent Examining Art Unit 2509